United States Patent
Zhao et al.

(10) Patent No.: US 8,544,382 B2
(45) Date of Patent: Oct. 1, 2013

(54) HEAT DISTRIBUTING COOKING GRATE

(75) Inventors: Jie Zhao, Saint Joseph, MI (US); Sherman S. Lin, Chino Hills, CA (US); James M. White, Hunterville, NC (US)

(73) Assignee: Whirlpool Corporation, Benton Harbor, MI (US)

( * ) Notice: Subject to any disclaimer, the term of this patent is extended or adjusted under 35 U.S.C. 154(b) by 1269 days.

(21) Appl. No.: 11/843,870

(22) Filed: Aug. 23, 2007

(65) Prior Publication Data

US 2009/0049997 A1 Feb. 26, 2009

(51) Int. Cl.
*A47J 37/10* (2006.01)

(52) U.S. Cl.
USPC .............................. 99/447; 99/450; 126/152 B

(58) Field of Classification Search
USPC ........... 99/450, 401, 447, 445, 446; 126/9 R, 126/25 R, 337 R, 339, 152 B; 211/175
See application file for complete search history.

(56) References Cited

U.S. PATENT DOCUMENTS

| | | | | |
|---|---|---|---|---|
| 1,178,298 A | * | 4/1916 | Carlton | 99/447 |
| 1,221,228 A | * | 4/1917 | Shaffner | 99/388 |
| 1,723,413 A | * | 8/1929 | Drehmann | 126/275 R |
| 2,420,112 A | * | 5/1947 | Utzler | 29/897.15 |
| 2,622,186 A | * | 12/1952 | Hutchens | 219/430 |
| 3,566,589 A | * | 3/1971 | Voloshen et al. | 56/14.1 |
| 4,002,113 A | * | 1/1977 | McLane | 99/447 |
| 4,403,541 A | * | 9/1983 | Berger | 99/385 |
| 4,432,334 A | | 2/1984 | Holt | |
| 4,553,523 A | | 11/1985 | Stohrer, Jr. | |
| 4,867,050 A | * | 9/1989 | Patenaude et al. | 99/400 |
| 4,930,488 A | | 6/1990 | Pearman et al. | |
| 4,930,491 A | * | 6/1990 | Purello | 126/332 |
| 5,333,596 A | | 8/1994 | Clifford | |
| 5,368,808 A | | 11/1994 | Koike et al. | |
| D364,777 S | | 12/1995 | Schlosser et al. | |
| 5,471,916 A | | 12/1995 | Bird et al. | |
| 5,490,452 A | | 2/1996 | Schlosser et al. | |
| 5,536,518 A | * | 7/1996 | Rummel | 426/523 |
| 5,617,840 A | | 4/1997 | Clifford | |
| 5,638,808 A | * | 6/1997 | Home | 126/41 R |
| 5,782,166 A | * | 7/1998 | Lin | 99/340 |
| 5,813,394 A | | 9/1998 | Clifford | |
| 5,839,361 A | | 11/1998 | Richter | |
| D402,503 S | | 12/1998 | Sanchez | |
| 5,964,145 A | * | 10/1999 | Brown | 99/422 |
| 6,050,257 A | * | 4/2000 | Bond | 126/25 R |
| 6,116,230 A | | 9/2000 | Clifford et al. | |
| 6,133,554 A | | 10/2000 | Clifford | |
| 6,189,527 B1 | | 2/2001 | Walsh et al. | |
| 6,220,854 B1 | | 4/2001 | Clifford et al. | |

(Continued)

FOREIGN PATENT DOCUMENTS

WO 2004/054416 A1 7/2004

*Primary Examiner* — Reginald L Alexander

(57) ABSTRACT

The present invention relates to cooking grates for use in connection with grills, ovens and/or range tops. In one embodiment, the present invention relates to a cooking grate that is designed to be used in conjunction with a barbecue grill, where the cooking grate is designed to evenly distribute heat across the entire surface of the grate in order to eliminate, and/or reduce, any "hot" or "cold" spots thereon. In another embodiment, the present invention relates to a cooking grate that contains one or more heat transmitting members positioned in such a manner that heat is transmitted from the central portion of the cooking grate to the edge portions thereof, thereby facilitating a more even heat distribution across the entire cooking surface of the cooking grate.

14 Claims, 5 Drawing Sheets

(56) References Cited

U.S. PATENT DOCUMENTS

| | | |
|---|---|---|
| 6,286,708 B1 | 9/2001 | Scheibmeir et al. |
| 6,314,868 B1 * | 11/2001 | Christensen et al. ........... 99/340 |
| 6,382,961 B2 | 5/2002 | Clifford et al. |
| 6,880,493 B2 | 4/2005 | Clifford |
| 7,073,429 B2 * | 7/2006 | Bruno et al. .................... 99/400 |
| 2004/0216621 A1 | 11/2004 | Schlosser et al. |

* cited by examiner

HEAT DISTRIBUTING COOKING GRATE

FIELD OF THE INVENTION

The present invention relates to cooking grates for use in connection with grills, ovens and/or range tops. In one embodiment, the present invention relates to a cooking grate that is designed to be used in conjunction with a barbecue grill, where the cooking grate is designed to evenly distribute heat across the entire surface of the grate in order to eliminate, and/or reduce, any "hot" or "cold" spots thereon. In another embodiment, the present invention relates to a cooking grate that contains one or more heat transmitting members positioned in such a manner that heat is transmitted from the central portion of the cooking grate to the edge portions thereof, thereby facilitating a more even heat distribution across the entire cooking surface of the cooking grate.

BACKGROUND OF THE INVENTION

The popularity of barbecue grills and outdoor cooking apparatuses has increased tremendously over the last twenty-five years. Initially, charcoal barbecue grills having some type of combustible solid fuel were utilized to cook food via radiant and convective heat. More recently, gas barbecue grills which employ one or more gas-fueled burners have been utilized. Such gas barbecue grills generally cook the food via radiant and convective heat. Often, the food to be cooked in both charcoal and gas grills is situated on a grid-like cooking grate having numerous elongated bars and openings. Accordingly, to cook food in such barbecue grills, the radiant and convective heat energy produced from either the solid fuel (e.g., charcoal) or the one or more gas burners passes through the cooking grate in such a manner that the heat is directed at the food.

Furthermore, conventional gas grills generally include a burner assembly adjacent the lower portion of a firebox with a cooking grid supported along the upper edge thereof. Lava rock or some other ancillary conductive member is generally located between the cooking grid and the burner assembly. The lava rock operates as a type of conductive member thereby absorbing the convective heat generated by the burning of the fuel source (e.g., charcoal, wood, gas, etc.), and subsequently assists in providing a more uniform convective heat-emitting means for supplying heat to the food being cooked on the cooking grate. Unfortunately, the heat distribution from such lava rocks, the burners, and/or the fuel source(s) is/are not uniform. Although not limited thereto, such a situation is a common occurrence near the edge of the cooking grid where the amount of heat generated by the fuel source tends to be uneven and/or poorly transmitted. Accordingly, "hot" and "cold" spots develop where the temperature of the heat being supplied to the cooking grate can vary significantly, thereby yielding a cooking grid with inconsistent temperatures. This in turn leads to the uneven cooking of any food material that is placed in a "cold" spot.

Accordingly, there is a need for a cooking grate that operates as a conductive member and which also provides an even, or nearly even, temperature across the entire cooking surface thereof.

SUMMARY OF THE INVENTION

The present invention relates to cooking grates for use in connection with grills, ovens and/or range tops. In one embodiment, the present invention relates to a cooking grate that is designed to be used in conjunction with a barbecue grill, where the cooking grate is designed to evenly distribute heat across the entire surface of the grate in order to eliminate, and/or reduce, any "hot" or "cold" spots thereon. In another embodiment, the present invention relates to a cooking grate that contains one or more heat transmitting members positioned in such a manner that heat is transmitted from the central portion of the cooking grate to the edge portions thereof, thereby facilitating a more even heat distribution across the entire cooking surface of the cooking grate.

In one embodiment, the present invention relates to a cooking grate for use with a barbecue grill comprising: a plurality of cooking members; at least two support members; and a plurality of heat transmitting members, wherein the combination of the plurality of cooking members and the at least two support members form a cooking grate, and wherein the plurality of heat transmitting members are linear members positioned to distribute heat evenly, or substantially evenly, across the entire surface of the cooking grate in order to eliminate, or reduce, any hot or cold spots thereon.

In another embodiment, the present invention relates to a cooking grate for use with a barbecue grill comprising: a plurality of cooking members; at least two support members; and a plurality of heat transmitting members, wherein the combination of the plurality of cooking members and the at least two support members form a cooking grate, and wherein the plurality of heat transmitting members are fin-shaped members positioned to distribute heat evenly, or substantially evenly, across the entire surface of the cooking grate in order to eliminate, or reduce, any hot or cold spots thereon.

In still another embodiment, the present invention relates to a cooking grate for use with a barbecue grill comprising: a plurality of cooking members; at least two support members; and a plurality of heat transmitting members, wherein the combination of the plurality of cooking members and the at least two support members form a cooking grate, and wherein the plurality of heat transmitting members are linear members positioned in such a manner that heat is transmitted from the central portion of the cooking grate to the edge portions thereof, thereby facilitating a more even heat distribution across the entire cooking surface of the cooking grate.

DETAILED DESCRIPTION OF THE INVENTION

The present invention relates to cooking grates for use in connection with grills, ovens and/or range tops. In one embodiment, the present invention relates to a cooking grate that is designed to be used in conjunction with a barbecue grill, where the cooking grate is designed to evenly distribute heat across the entire surface of the grate in order to eliminate, and/or reduce, any "hot" or "cold" spots thereon. In another embodiment, the present invention relates to a cooking grate that contains one or more heat transmitting members positioned in such a manner that heat is transmitted from the central portion of the cooking grate to the edge portions thereof, thereby facilitating a more even heat distribution across the entire cooking surface of the cooking grate.

Figure 1:
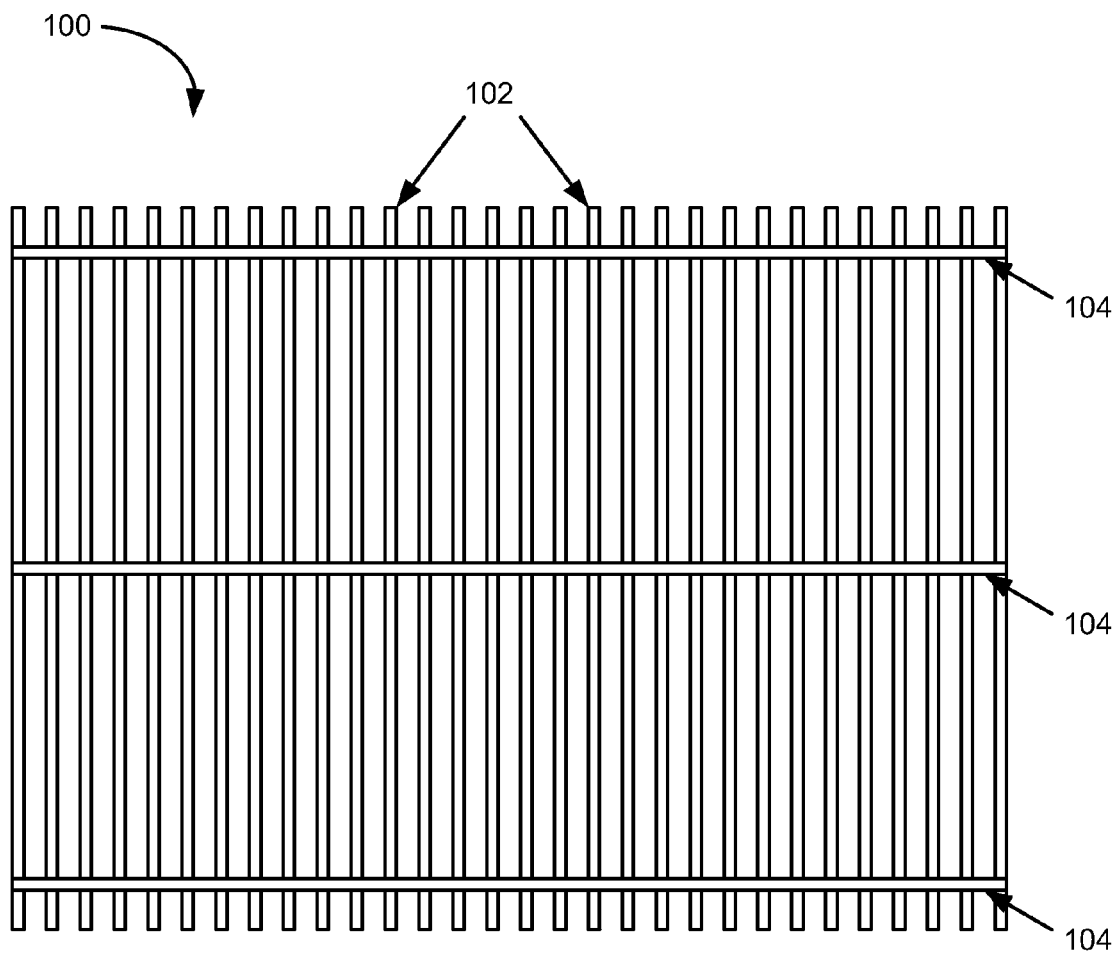
FIG. 1 is a bottom view of a prior art cooking grate.

Turning to the Figures, FIG. 1 is a bottom view of a cooking grate 100 formed in accordance with the prior art. Cooking grate 100 is generally used in connection with a barbecue grill, although such grates also find use in home appliances such as ovens and range tops. As can be seen in FIG. 1, cooking grate 100 consists of multiple cooking members 102 and support members 104. Ideally, when in use, food is placed onto the surface of cooking members 102 opposite the surface to which support members 104 are attached. As is detailed above, due to various factors, cooking grate 100 suffers from "hot" and "cold" spots that are either hotter or colder than the average temperature being generated by the combustion of the fuel source of the grill in which cooking grate 100 is located.

Turning to the present invention, FIGS. 2A through 4 illustrate various embodiments thereof. Although rectangular and circular cooking grates are shown herein, the present invention is applicable to any cooking grate regardless of shape.

Figure 2A:
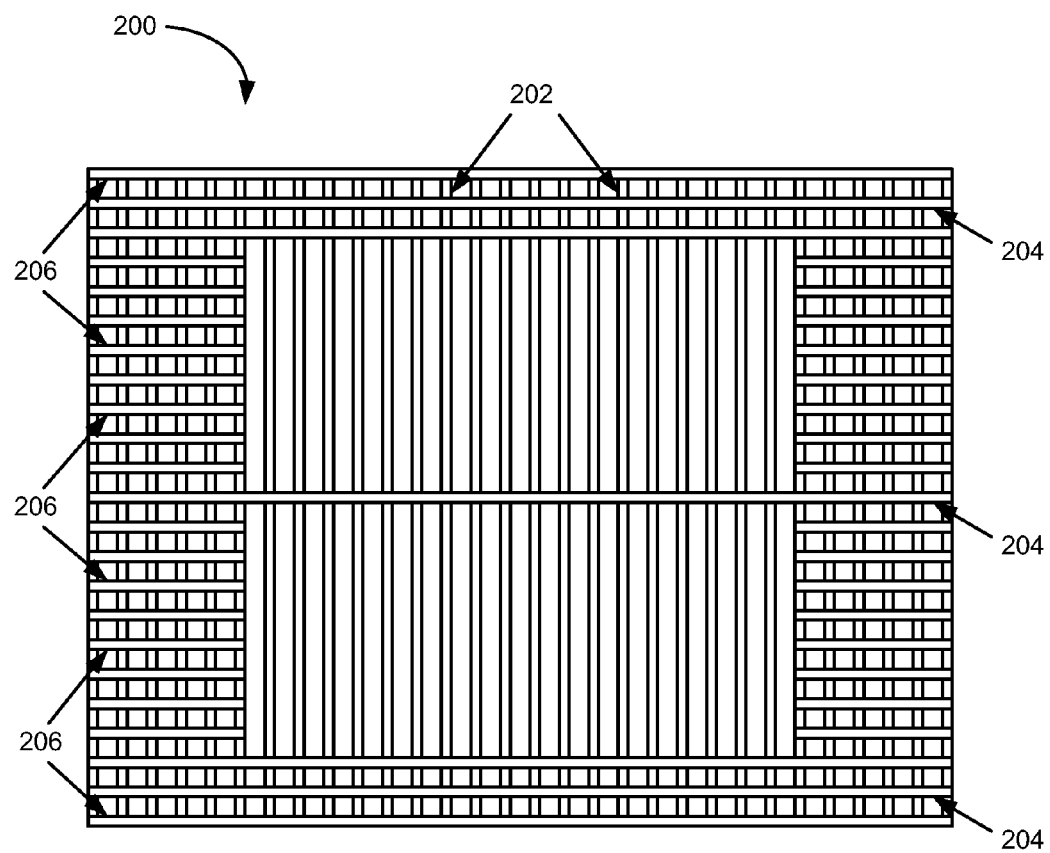
FIG. 2A is a bottom view of a cooking grate formed in accordance with one embodiment of the present invention.

Specifically, FIG. 2A illustrates a cooking grate 200 according to one embodiment of the present invention that comprises cooking members 202, support members 204, and a plurality of heat transmitting members 206. In one embodiment, support members 204 can also act as additional heat transmitting members 206. Generally, although not limited thereto, cooking members 202 and support members 204 are formed from the same material. Thus, cooking members 202 and support members 204 can be formed from any suitable material so long as that material is corrosion resistant and able to withstand the heat generated by the grill, oven and/or stove top. Suitable materials for cooking members 202 and support members 204 include, but are not limited to, corrosion resistant and heat transmitting metals (e.g., stainless steel, aluminum, titanium, silver, gold, etc. and alloys of two or more thereof) and ceramics.

In one embodiment, cooking members 202 and support members 204 are formed from stainless steel and/or stainless steel-coated metals (e.g., stainless steel coated copper). In the embodiments where cooking members 202 and support members 204 are formed from metal, the cooking members 202 and support members 204 are joined together by any suitable means such as welding. In the embodiment where cooking members 202 and support members 204 are formed from a ceramic compound, cooking members 202 and support members 204 are joined together by any suitable means such as a high temperature ceramic glue or adhesive (e.g., a silicon-aluminum hybrid glue/adhesive). In still another embodiment, cooking members 202 and support members 204 could all be formed from a single cast piece of metal, or a single three-dimensional ceramic pattern.

It should be noted that the cross-sectional shape, or geometry, of cooking members 202 and support members 204 is not critical to the present invention. Accordingly, cooking members 202 and support members 204 can be any suitable shape. Suitable shapes for cooking members 202 and support members 204 include, but are not limited to, square, rectangular, round, elliptical, and polygonal. In still another embodiment, the corners of any polygonal-shaped cooking members 202 and support members 204 can be rounded.

Turning to heat transmitting members 206, heat transmitting members 206 are formed from any suitable material that is both corrosion resistant and able to transmit heat. Suitable materials that can be used to form heat transmitting members 206 include, but are not limited to, corrosion resistant and heat transmitting metals (e.g., stainless steel, aluminum, titanium, silver, gold, etc. and alloys of two or more thereof) and ceramics. In one embodiment, heat transmitting members 206 are formed from the same type of material, or an identical material, that is used to form either one or both of the cooking members 202 and support members 204. For example, cooking members 202, support members 204, and heat transmitting members 206 can all be formed from stainless steel. In another embodiment, heat transmitting members 206 can be formed from some other suitable metal or alloy, or a stainless steel-coated metal.

In still another embodiment, heat transmitting members 206 are formed from a different material than that used to form either one or both of the cooking members 202 and support members 204. For example, heat transmitting members 206 could be formed from a ceramic compound, while cooking members 202 and support members 204 could be formed from the same, or a different, metal.

It should be noted that the cross-sectional shape, or geometry, of heat transmitting members 206 is not critical to the present invention. Accordingly, heat transmitting members 206 can be any suitable shape. Suitable shapes for heat transmitting members 206 include, but are not limited to, square, rectangular, round, elliptical, and polygonal. In still another embodiment, the corners of any polygonal-shaped heat transmitting members 206 can be rounded.

It should be noted that the present invention is not limited to any one layout or design as far as the orientation and position of heat transmitting members 206. All that is required is that the plurality of heat transmitting members 204 are positioned in such a manner so that heat is evenly, or nearly evenly, distributed across the surface of cooking grate 200. In one embodiment, heat transmitting members 206 are short linear members that are positioned in such a manner that heat is transmitted from the center of cooking grate 200 to the outer edges thereof (see FIG. 2A). In another embodiment, the heat transmitting members can be positioned in view of the burner, flame and/or heat source geometry of a specific grill, oven, or range top. In still another embodiment, heat transmitting members 204 are located on the bottom surface of cooking members 202 and do not act to provide support to, or a cooking surface for, any food matter placed on cooking grate 200.

Due to the alignment and positioning of heat transmitting members 206, a cooking grate 200 in accordance with the present invention eliminates and/or reduces any "hot" or "cold" spots on the cooking surface thereof. This in turn enables one to fully utilize the entire cooking surface of cooking grate 200. Additionally, the temperature of the cooking surface of cooking grate 200 is more likely to be even, or nearly even, thereby eliminating the uneven cooking of one or more food items placed thereon.

In the embodiments where heat transmitting members 206 are formed from metal, heat transmitting members 206 are joined and/or attached to the non-cooking surface of cooking members 202 by any suitable means such as welding. In the embodiment where heat transmitting members 206 are formed from a ceramic compound, heat transmitting members 206 are joined and/or attached to the non-cooking surface of cooking members 202 by any suitable means such as a high temperature glue or adhesive (e.g., a silicon-aluminum hybrid glue/adhesive).

Figure 2B:
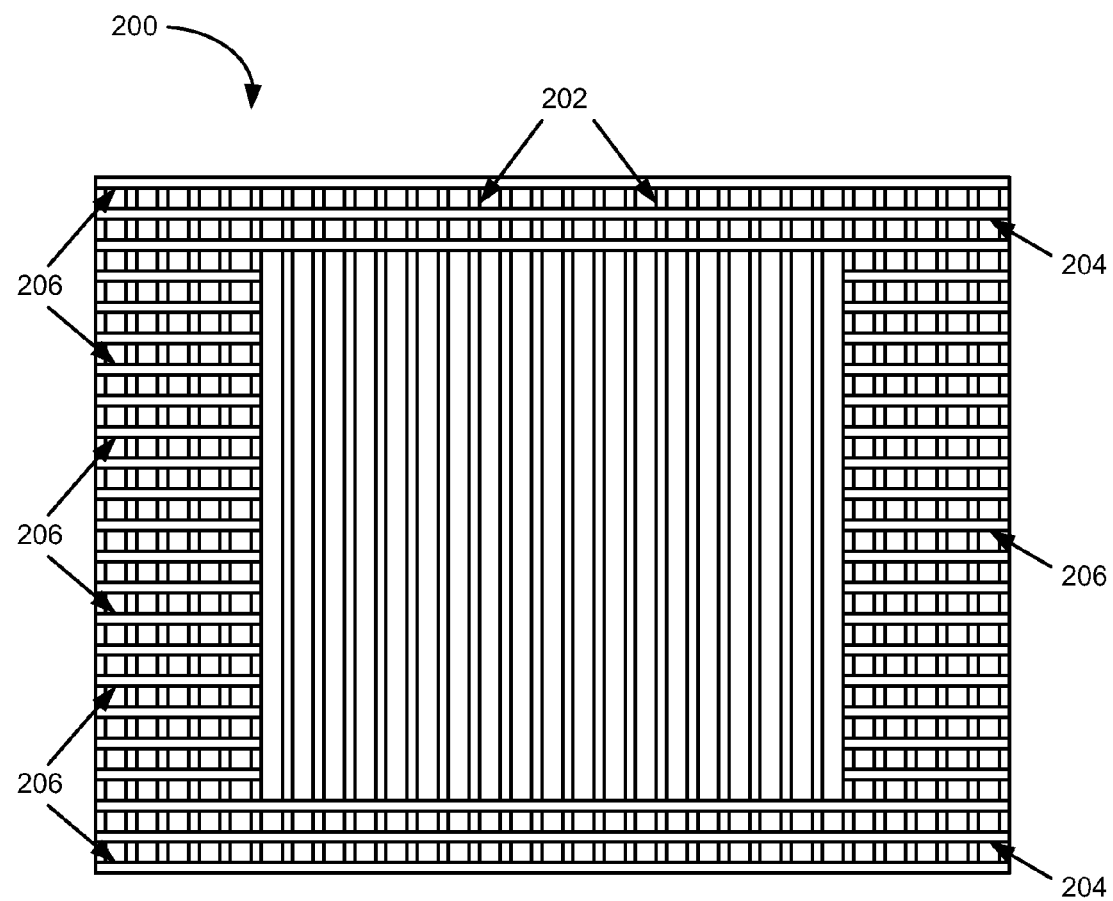
FIG. 2B is a bottom view of a cooking grate formed in accordance with another embodiment of the present invention.

Turning to FIG. 2B, FIG. 2B illustrates an alternative embodiment of FIG. 2A. In the embodiment of FIG. 2B, central support member 204 of cooking grate 200 has been replaced by two additional heat transmitting members 206.

Figure 3:
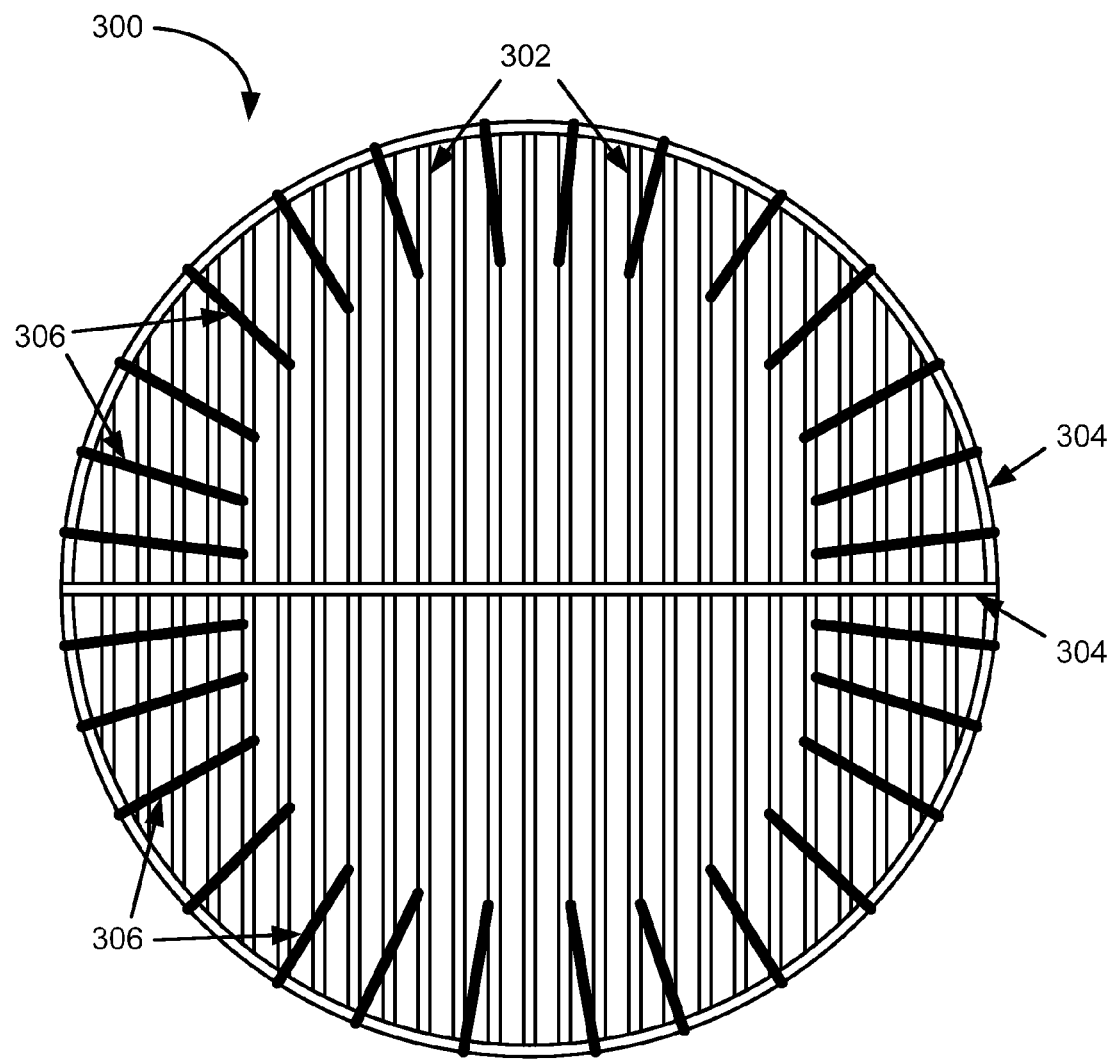
FIG. 3 is a bottom view of a cooking grate formed in accordance with still another embodiment of the present invention.

Turning to FIG. 3, FIG. 3 illustrates a round cooking grate 300 that is formed cooking members 302, support members 304, and a plurality of heat transmitting members 306. In one embodiment, support members 304 can also act as additional heat transmitting members 306. Generally, although not limited thereto, cooking members 302 and support members 304 are formed from the same material. Thus, cooking members 302 and support members 304 can be formed from any suitable material so long as that material is corrosion resistant and able to withstand the heat generated by the grill, oven and/or stove top. Suitable materials for cooking members 302 and support members 304 include, but are not limited to, corrosion resistant and heat transmitting metals (e.g., stainless steel, aluminum, titanium, silver, gold, etc. and alloys of two or more thereof) and ceramics.

In one embodiment, cooking members 302 and support members 304 are formed from stainless steel and/or stainless steel-coated metals (e.g., stainless steel coated copper). In the embodiments where cooking members 302 and support members 304 are formed from metal, the cooking members 302 and support members 304 are joined together by any suitable means such as welding. In the embodiment where cooking members 302 and support members 304 are formed from a ceramic compound, cooking members 302 and support members 304 are joined together by any suitable means such as a high temperature ceramic glue or adhesive (e.g., a silicon-aluminum hybrid glue/adhesive). In still another embodiment, cooking members 302 and support members 304 could all be formed from a single cast piece of metal, or a single three-dimensional ceramic pattern.

Again, it should be noted that the cross-sectional shape, or geometry, of cooking members 302 and support members 304 is not critical to the present invention. Accordingly, cooking members 302 and support members 304 can be any suitable shape. Suitable shapes for cooking members 302 and support members 304 include, but are not limited to, square, rectangular, round, elliptical, and polygonal. In still another embodiment, the corners of any polygonal-shaped cooking members 302 and support members 304 can be rounded.

Turning to heat transmitting members 306, heat transmitting members 306 are formed from any suitable material that is both corrosion resistant and able to transmit heat. Suitable materials that can be used to form heat transmitting members 306 include, but are not limited to, corrosion resistant and heat transmitting metals (e.g., stainless steel, aluminum, titanium, silver, gold, etc. and alloys of two or more thereof) and ceramics. In one embodiment, heat transmitting members 306 are formed from the same type of material, or an identical material, that is used to form either one or both of the cooking members 302 and support members 304. For example, cooking members 302, support members 304, and heat transmitting members 306 can all be formed from stainless steel. In another embodiment, heat transmitting members 306 can be formed from some other suitable metal or alloy, or a stainless steel-coated metal.

In still another embodiment, heat transmitting members 306 are formed from a different material than that used to form either one or both of the cooking members 302 and support members 304. For example, heat transmitting members 306 could be formed from a ceramic compound, while cooking members 302 and support members 304 could be formed from the same, or a different, metal.

It should be noted that the cross-sectional shape, or geometry, of heat transmitting members 306 is not critical to the present invention. Accordingly, heat transmitting members 306 can be any suitable shape. Suitable shapes for heat transmitting members 306 include, but are not limited to, square, rectangular, round, elliptical, and polygonal. In still another embodiment, the corners of any polygonal-shaped heat transmitting members 306 can be rounded.

It should be noted that the present invention is not limited to any one layout or design as far as the orientation and position of heat transmitting members 306. All that is required is that the plurality of heat transmitting members 304 are positioned in such a manner so that heat is evenly, or nearly evenly, distributed across the surface of cooking grate 300. In one embodiment, heat transmitting members 306 are short linear members that are positioned radially in such a manner that heat is transmitted from the center of cooking grate 300 to the outer edges thereof (see FIG. 3). In another embodiment, the heat transmitting members can be positioned in view of the burner, flame and/or heat source geometry of a specific grill, oven, or range top. In still another embodiment, heat transmitting members 304 are located on the bottom surface of cooking members 302 and do not act to provide support to, or a cooking surface for, any food matter placed on cooking grate 300.

Due to the alignment and positioning of heat transmitting members 306, a cooking grate 300 in accordance with the present invention eliminates and/or reduces any "hot" or "cold" spots on the cooking surface thereof. This in turn enables one to fully utilize the entire cooking surface of cooking grate 300. Additionally, the temperature of the cooking surface of cooking grate 300 is more likely to be even, or nearly even, thereby eliminating the uneven cooking of one or more food items placed thereon.

In the embodiments where heat transmitting members 306 are formed from metal, heat transmitting members 306 are joined and/or attached to the non-cooking surface of cooking members 302 by any suitable means such as welding. In the embodiment where heat transmitting members 306 are formed from a ceramic compound, heat transmitting members 306 are joined and/or attached to the non-cooking surface of cooking members 302 by any suitable means such as a high temperature glue or adhesive (e.g., a silicon-aluminum hybrid glue/adhesive).

Figure 4:
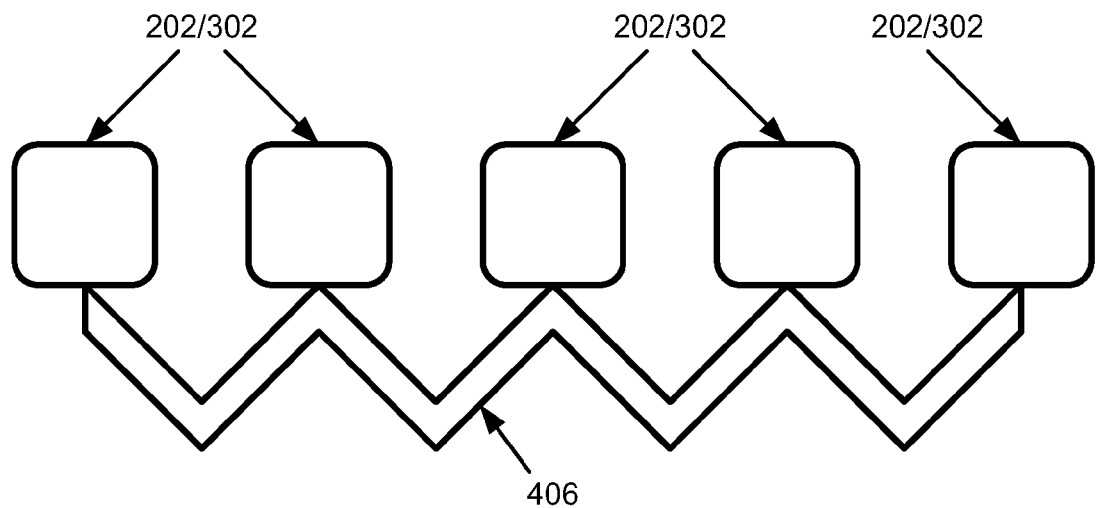
FIG. 4 is a close-up side view of five cooking members of a cooking grate with a heat-transmitting means attached thereto.

FIG. 4 is a close-up side view of five member cooking members 202 or 302 of a cooking grate 200 or 300, respectively, where a linear heat transmitting member 206 or 306 has been replaced by a heat transmitting metal fin 406 similar to a heat sink fin used in the electronics field. Fin 406 can be formed from any suitable heat transmitting metal as is discussed above with regard to heat transmitting members 206 or 306. Additionally, fin 406 is not limited to just the angular embodiment shown in FIG. 4. Rather, fin 406 could be formed to be any suitable shape so long as such a fin is able to be attached to the underside of cooking members 202 or 302. For example, fin 406 could be a sinusoidal-shaped metal fin (not shown).

Additionally, as would be apparent to those of skill in the art, the present invention is not limited to any one layout, design and/or orientation of cooking grate. Specifically, cooking members 202 and 302 can be oriented in any desired regular or irregular pattern. For example, cooking members 302 of cooking grate 300 could be replaced by circular cooking members formed from concentric circles of different sizes. In this case, support members 304 would extend radially outward from the innermost concentric cooking member, while heat transmitting members 306 could be, if so desired, positioned to extend radially inward from the outer edges of cooking grate 300 (see the orientation of the heat transmitting members of FIG. 3).

Furthermore, the cooking grates in accordance with the present invention should be designed in view of a number of different factors including, but not limited to, air flow requirements (i.e., oxygen flow requirements); strength requirements (e.g., a cooking grate should be strong enough to support any food placed thereon); and heat conductivity requirements.

Although the invention has been described in detail with particular reference to certain embodiments detailed herein, other embodiments can achieve the same results. Variations and modifications of the present invention will be obvious to those skilled in the art, and the present invention is intended to cover in the appended claims all such modifications and equivalents.

The invention claimed is:

1. A cooking grate for use with a barbecue grill comprising:
a plurality of cooking members, the plurality of cooking members defining a cooking surface,
at least two support members secured to a number of the plurality of cooking members, and
a plurality of heat transmitting members, each heat transmitting member of the plurality of heat transmitting members having a body (i) in contact with and secured to at least two cooking members and (ii) formed as an angular fin extending downwardly from the at least two cooking members therefrom,
wherein the plurality of heat transmitting members are arranged to distribute heat evenly, or substantially evenly, across the cooking surface of the cooking grate in order to eliminate, or reduce, any hot or cold spots thereon,
wherein the combination of the cooking members and the at least two support members form a circular cooking grate, and
wherein the plurality of cooking members define a non-cooking surface positioned opposite the cooking surface, and the plurality of heat transmitting members are positioned radially on the non-cooking surface of the circular cooking grate.

2. The cooking grate of claim 1, wherein the plurality of cooking members, the at least two support members and the plurality of heat transmitting members are all formed from stainless steel.

3. The cooking grate of claim 1, wherein the plurality of cooking members and the at least two support members are formed from metal bars that are oriented in a perpendicular grid-like manner to one another to form a first grid pattern when the cooking grate is viewed in a bottom plan view.

4. The cooking grate of claim 1, wherein the plurality of cooking members and the at least two support members are formed from metal bars.

5. The cooking grate of claim 4, wherein the plurality of cooking members are parallel to one another.

6. The cooking grate of claim 3, wherein: the plurality of heat transmitting members are formed from metal bars, the plurality of cooking members, the at least two support members, and the plurality of heat transmitting members are oriented in a perpendicular grid-like manner to one another to form a second grid pattern when the cooking grate is viewed in the bottom plan view, and the second grid pattern has a greater density than the first grid pattern.

7. A cooking grate for use with a barbecue grill comprising:
a plurality of cooking members, the plurality of cooking members defining a cooking surface and a non-cooking surface positioned below the cooking surface, at least two support members secured the non-cooking surface, and a plurality of fin-shaped heat transmitting members positioned below the non-cooking surface, wherein each fin-shaped heat transmitting member of the plurality of fin-shaped heat transmitting members has a body in contact with and is secured to at least two cooking members to distribute heat evenly, or substantially evenly, across the cooking surface of the cooking grate in order to eliminate, or reduce, any hot or cold spots thereon, wherein the plurality of cooking members and the at least two support members are formed from metal bars, where the combination of the cooking members and the at least two support members form a circular cooking grate, and wherein the plurality of fin-shaped heat transmitting members are positioned radially on the non-cooking surface of the circular cooking grate.

8. The cooking grate of claim 7, wherein the plurality of cooking members, the at least two support members and the plurality of fin-shaped heat transmitting members are all formed from stainless steel.

9. The cooking grate of claim 7, wherein the plurality of cooking members and the at least two support members are formed from metal bars that are oriented in a perpendicular grid-like manner to one another to form a first grid pattern when the cooking grate is viewed in a bottom plan view.

10. The cooking grate of claim 9, wherein the plurality of cooking members and the plurality of support members form a rectangular shaped cooking grate.

11. The cooking grate of claim 7, wherein the plurality of cooking members are parallel to one another.

12. The cooking grate of claim 9, wherein: the plurality of fin-shaped heat transmitting members are formed from metal bars, the plurality of cooking members, the at least two support members, and the plurality of fin-shaped heat transmitting members are oriented in a perpendicular grid-like manner to one another to form a second grid pattern when the cooking grate is viewed in the bottom plan view, and the second grid pattern has a greater density than the first grid pattern.

13. A circular cooking grate for use with a barbecue grill comprising:
a plurality of cooking members defining a cooking surface,
a circular support member secured to the plurality of cooking members, the circular support defining an outer edge of the circular cooking grate, and
a plurality of heat transmitting members, each heat transmitting member being secured to the circular support member and at least two cooking members, each heat transmitting member being formed as an angular fin extending downwardly therefrom, wherein the plurality of heat transmitting members extend from the outer edge of the circular cooking grate toward the center of the circular cooking grate such that heat is transmitted from a central area of the circular cooking grate to the outer edge thereof, thereby facilitating a more even heat distribution across the cooking surface.

14. The cooking grate of claim 13, wherein the plurality of cooking members, the circular at least two support members and the plurality of heat transmitting members are all formed from stainless steel.

* * * * *